United States Patent
Park et al.

(10) Patent No.: US 10,085,249 B2
(45) Date of Patent: Sep. 25, 2018

(54) METHOD OF TRANSMITTING AND RECEIVING DOWNLINK CONTROL INFORMATION AND APPARATUSES THEREOF

(71) Applicant: KT CORPORATION, Gyeonggi-do (KR)

(72) Inventors: Kyujin Park, Seoul (KR); Woo-jin Choi, Seoul (KR)

(73) Assignee: KT CORPORATION, Gyeonggi-do (KR)

( * ) Notice: Subject to any disclaimer, the term of this patent is extended or adjusted under 35 U.S.C. 154(b) by 127 days.

(21) Appl. No.: 15/260,373

(22) Filed: Sep. 9, 2016

(65) Prior Publication Data

US 2017/0094643 A1    Mar. 30, 2017

(30) Foreign Application Priority Data

Sep. 24, 2015 (KR) .......... 10-2015-0135756
Nov. 19, 2015 (KR) .......... 10-2015-0162286
Aug. 3, 2016 (KR) .......... 10-2016-0098858

(51) Int. Cl.
*H04W 72/04* (2009.01)
*H04W 24/00* (2009.01)
(Continued)

(52) U.S. Cl.
CPC ......... *H04W 72/042* (2013.01); *H04L 5/0053* (2013.01); *H04W 4/70* (2018.02);
(Continued)

(58) Field of Classification Search
CPC ..... H04W 72/042; H04W 4/70; H04W 24/00; H04W 48/16; H04W 88/02
See application file for complete search history.

(56) References Cited

U.S. PATENT DOCUMENTS

2015/0078224 A1* 3/2015 Xiong ................ H04L 1/1887
370/280
2016/0043849 A1   2/2016 Lee et al.
(Continued)

FOREIGN PATENT DOCUMENTS

CN    104349333 A     2/2015
WO    2014/165678 A2  10/2014
WO    2015/050339 A1  4/2015

OTHER PUBLICATIONS

Huawei et al., "Configuring combinations of repetition level and aggregation level", R1-152448, 3GPP TSG RA WG1 Meeting #81, Fukuoka, Japan, May 25-29, 2015, pp. 1-3.
(Continued)

*Primary Examiner* — Thai Nguyen
(74) *Attorney, Agent, or Firm* — IP Legal Services, LLC

(57) ABSTRACT

The present disclosure relates to a method of transmitting and receiving downlink control information and an apparatus thereof. Particularly, the present disclosure relates to a method and apparatus for configuring aUE-USS when a downlink control search space is configured for a UE that supports a coverage enhancement operation or a low complexity UE category/type for a machine type communication (MTC) operation. Particularly, a method may include: receiving a higher layer signaling including at least one of maximum repetition level information and offset information; calculating a location of a start subframe where the repetitive transmission of a downlink control channel starts by using a higher layer signaling; monitoring a UE-specific search space in two or more subframes including the start subframe; and repetitively receiving a downlink control channel including downlink control information through the UE-specific search space.

9 Claims, 6 Drawing Sheets

(51) Int. Cl.
  *H04W 4/70*   (2018.01)
  *H04L 5/00*   (2006.01)
  *H04W 88/02*  (2009.01)
  *H04W 48/16*  (2009.01)

(52) U.S. Cl.
  CPC ............ *H04W 24/00* (2013.01); *H04W 48/16* (2013.01); *H04W 88/02* (2013.01)

(56) References Cited

U.S. PATENT DOCUMENTS

2016/0249331 A1   8/2016   Park et al.
2018/0026759 A1*  1/2018   Zhu .................. H04W 4/70
                                              370/329

OTHER PUBLICATIONS

Mediatek Inc., "Search space design for M-PDCCH", R1-153319, 3GPP TSG RA WG1 Meeting #81, Fukuoka, Japan, May 25-29, 2015, pp. 1-4.
Samsung, "M-PDCCH Design", R1-154095, 3GPP TSG RAN WG1 #82, Beijing, China, Aug. 24-28, 2015, pp. 1-5.

\* cited by examiner

METHOD OF TRANSMITTING AND RECEIVING DOWNLINK CONTROL INFORMATION AND APPARATUSES THEREOF

CROSS REFERENCE TO RELATED APPLICATION

This application claims priority from Korean Patent Application Nos. 10-2015-0135756, 10-2015-0162286 & 10-2016-0098858 filed on Sep. 24, 2015, Nov. 19, 2015 & Aug. 3, 2016 which are hereby incorporated by reference for all purposes as if fully set forth herein.

BACKGROUND OF THE INVENTION

1. Field of the Invention

The present disclosure relates to a method of transmitting and receiving downlink control information and an apparatus thereof. Particularly, the present disclosure relates to a method and apparatus for configuring a user equipment (UE)-specific search space (USS) when a downlink control channel search space is configured for a UE that supports a coverage enhancement operation or a low complexity UE category/type for a machine type communication (MTC) operation.

2. Description of the Prior Art

Machine type communication (MTC) is a type of data communication, which refers to device-to-device communication or thing-to-thing communication (machine to machine communication) in which one or more entities do not necessarily require human interaction. The MTC that does not require human interaction indicates all types of communication schemes that provide communication without human intervention during a communication process.

An MTC UE may be installed in a place that has a poor propagation environment when compared to a typical UE. To enable the MTC UE to operate in the place having a propagation environment that is worse than that of the typical UE, control information and/or data of each physical channel, which is transmitted based on only a single subframe unit, needs to be repeatedly transmitted in a plurality of subframes.

In the case of the MTC UE, a degree of coverage enhancement that is required for each radio channel environment may be different, and the number of repetitive to transmissions, a transmission power, and the like may be set to be different for each of a plurality of coverage enhancement levels in a single cell.

In this instance, when the same UE-specific search space is set for MTC UEs that are located in a single cell and have different coverage enhancement levels, inefficiency in utilizing radio resources may be caused by repetitive transmission or the like, which is a drawback.

SUMMARY OF THE INVENTION

In this background, an aspect of the present disclosure is to provide a method and apparatus for clearly determining a UE-specific search space in which downlink control information is transmitted with respect to an MTC user equipment (UE) that supports the enhancement of coverage.

Also, another aspect of the present disclosure is to provide a method and apparatus for determining the location of a start subframe where repetitive transmission starts when downlink control information is repetitively transmitted with respect to an MTC UE through a plurality of subframes.

In accordance with an aspect of the present disclosure, there is provided a method for a machine type communication (MTC) user equipment (UE) to receive downlink control information. The method may include: receiving a higher layer signaling including at least one of maximum repetition level information and offset information; calculating, by using the higher layer signaling, a location of a start subframe where repetitive transmission of a downlink control channel starts; monitoring a UE-specific search space in two or more subframes including the start subframe; and repetitively receiving the downlink control channel including downlink control information through the UE-specific search space.

In accordance with another aspect of the present disclosure, there is provided a method for a base station to transmit downlink control information. The method may include: transmitting, to a machine type communication (MTC) user equipment (UE), a higher layer signaling including at least one of maximum repetition level information and offset information; determining a start subframe of a downlink control channel for the MTC UE, by using the higher layer signaling; and repetitively transmitting the downlink control channel including downlink control information through two or more subframes including the start subframe.

In accordance with still another aspect of the present disclosure, there is provided a machine type communication (MTC) user equipment (UE) that receives downlink control information. The MTC UE may include: a receiving unit and a controller. The receiving unit may be configured to receive a comparatively higher layer signaling that includes at least one of maximum repetition level information and offset information. The controller may be configured to perform: calculating, by using the comparatively higher layer signaling, the location of a start subframe where repetitive transmission of a downlink control channel starts; and monitoring a UE-specific search space in two or more subframes including the start subframe, wherein the receiving unit repetitively receives the downlink control channel including the downlink control information through the UE-specific search space.

In accordance with yet another aspect of the present disclosure, there is provided a base station that transmits downlink control information. The base station may include: a transmitting unit and a controller. The transmitting unit may be configured to transmit a higher layer signaling that includes at least one of maximum repetition level information and offset information. The controller may be configured to determine a start subframe of a downlink control channel for the MTC UE, by using a higher layer signaling. The transmitting unit may be configured to repetitively transmit the downlink control channel including the downlink control information through two or more subframes including the start subframe.

In accordance with at least one embodiment, a UE-specific search space in which downlink control information is transmitted with respect to an MTC UE that supports enhancement of coverage may be clearly determined.

In accordance with at least one embodiment, in the event that downlink control information is repetitively transmitted with respect to an MTC UE through a plurality of subframes, repetitively transmitted downlink control information may be accurately recognized and received by determining the location of a start subframe where repetitive transmission starts.

BRIEF DESCRIPTION OF THE DRAWINGS

The above and other objects, features, and advantages of the present disclosure will be more apparent from the following detailed description taken in conjunction with the accompanying drawings, in which.

DETAILED DESCRIPTION OF THE EXEMPLARY EMBODIMENTS

Figure 1:
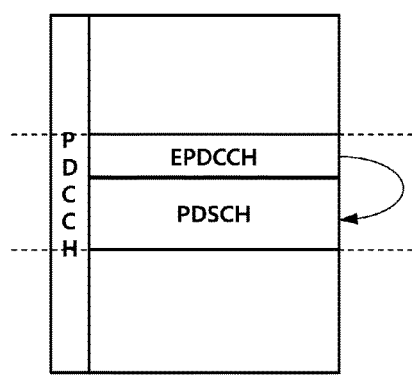
FIG. 1 is a diagram illustrating a PDCCH and an EPDCCH for transmitting downlink control information.

Hereinafter, embodiments of the present disclosure will be described in detail with reference to the accompanying drawings. In adding reference numerals to elements in each drawing, the same elements will be designated by the same reference numerals, if possible, although they are shown in different drawings. Further, in the following description of the present invention, a detailed description of known functions and configurations incorporated herein will be omitted when it is determined that the description may make the subject matter of the present disclosure rather unclear.

In the present specifications, a machine type communication (MTC) terminal refers to a low cost or low complexity terminal that supports coverage enhancement, or the like. Alternatively, in the present specifications, the MTC terminal refers to a terminal that is defined as a predetermined category for maintaining low costs (or low complexity) and/or coverage enhancement.

In other words, in the present specifications, the MTC terminal may refer to a newly defined third generation partnership project (3GPP) Release 13 low cost (or low complexity) UE category/type, which executes LTE-based MTC related operations. Alternatively, in the present specifications, the MTC terminal may refer to a UE category/type that is defined in or before 3GPP Release-12 that supports the enhanced coverage in comparison with the existing LTE coverage, or supports low power consumption, or may refer to a newly defined Release 13 low cost (or low complexity) UE category/type.

The wireless communication system may be widely installed so as to provide various communication services, such as a voice service, packet data, and the like. The wireless communication system may include a User Equipment (UE) and a Base Station (BS or an eNB). Throughout the specifications, the user equipment may be an inclusive concept indicating a user terminal utilized in wireless communication, including a UE (User Equipment) in wideband code division multiple access (WCDMA), long term evolution (LTE), high speed packet access (HSPA), and the like, and an MS (Mobile station), a UT (User Terminal), an SS (Subscriber Station), a wireless device, and the like in global systems for mobile communication (GSM).

A base station or a cell may generally refer to a station where communication with a User Equipment (UE) is performed. The base station or cell may also be referred to as a Node-B, an evolved Node-B (eNB), a Sector, a Site, a Base Transceiver System (BTS), an Access Point, a Relay Node, a Remote Radio Head (RRH), a Radio Unit (RU), and the like.

That is, the base station or the cell may be construed as an inclusive concept indicating a portion of an area covered by a BSC (Base Station Controller) in CDMA, a NodeB in WCDMA, an eNB or a sector (site) in LTE, and the like, and the concept may include various coverage areas, such as a megacell, a macrocell, a microcell, a picocell, a femtocell, a communication range of a relay node, and the like.

Each of the above mentioned various cells has a base station that controls a corresponding cell. Thus, the base station may be construed in two ways: i) the base station may be a device itself that provides a megacell, a macrocell, a microcell, a picocell, a femtocell, and a small cell in association with a wireless area; or ii) the base station may indicate a wireless area itself. In i), all devices that interact with one another so as to enable the devices that provide a predetermined wireless area to be controlled by an identical entity or to cooperatively configure the wireless area, may be indicated as a base station. Based on a configuration type of a wireless area, an eNB, an radio remote head (RRH), an antenna, an radio unit (RU), a Low Power Node (LPN), a point, a transmission/reception point, a transmission point, a reception point, and the like may be embodiments of a base station. In ii), a wireless area itself that receives or transmits a signal from a perspective of a terminal or a neighboring base station, may be indicated as a base station.

Therefore, a megacell, a macrocell, a microcell, a picocell, a femtocell, a small cell, an RRH, an antenna, an RU, an LPN, a point, an eNB, a transmission/reception point, a transmission point, and a reception point are commonly referred to as a base station.

In the specifications, the user equipment and the base station are used as two inclusive transceiving subjects to embody the technology and technical concepts described in the specifications, and may not be limited to a predetermined term or word. In the specification, the user equipment and the base station are used as two (uplink or downlink) inclusive transceiving subjects to embody the technology and technical concepts described in the specifications, and may not be limited to a predetermined term or word. Here, Uplink (UL) refers to a scheme for a UE to transmit and receive data to/from a base station, and Downlink (DL) refers to a scheme for a base station to transmit and receive data to/from a UE.

Varied multiple access schemes may be unrestrictedly applied to the wireless communication system. Various multiple access schemes, such as CDMA (Code Division Multiple Access), TDMA (Time Division Multiple Access), FDMA (Frequency Division Multiple Access), OFDMA (Orthogonal Frequency Division Multiple Access), OFDM-FDMA, OFDM-TDMA, OFDM-CDMA, and the like may be used. An embodiment of the present disclosure may be applicable to resource allocation in an asynchronous wireless communication scheme that is advanced through GSM, WCDMA, and HSPA, to be LTE and LTE-advanced, and may be applicable to resource allocation in a synchronous wireless communication scheme that is advanced through CDMA and CDMA-2000, to be UMB. The present disclosure may not be limited to a specific wireless communication field, and may include all technical fields in which the technical idea of the present invention is applicable.

Uplink transmission and downlink transmission may be performed based on a TDD (Time Division Duplex) scheme that performs transmission based on different times, or based on an FDD (Frequency Division Duplex) scheme that performs transmission based on different frequencies.

Further, in a system such as LTE and LTE-A, a standard may be developed by configuring an uplink and a downlink based on a single carrier or a pair of carriers. The uplink and the downlink may transmit control information through a control channel, such as a PDCCH (Physical Downlink Control CHannel), a PCFICH (Physical Control Format Indicator CHannel), a PITCH (Physical Hybrid ARQ Indicator CHannel), a PUCCH (Physical Uplink Control CHannel), an EPDCCH (Enhanced Physical Downlink Control CHannel), and the like, and may be configured as a data channel, such as a PDSCH (Physical Downlink Shared CHannel), a PUSCH (Physical Uplink Shared CHannel), and the like, so as to transmit data.

Control information may be transmitted using an EPDCCH (enhanced PDCCH or extended PDCCH).

In the present specification, a cell may refer to the coverage of a signal transmitted from a transmission/reception point, a component carrier having the coverage of the signal transmitted from the transmission/reception point (transmission point or transmission/reception point), or the transmission/reception point itself.

A wireless communication system, according to embodiments, refers to a Coordinated Multi-point transmission/reception (CoMP) system where two or more transmission/reception points cooperatively transmit a signal, a coordinated multi-antenna transmission system, or a coordinated multi-cell communication system. A CoMP system may include at least two multi-transmission/reception points and terminals.

A multi-transmission/reception point may be a base station or a macro cell (hereinafter, referred to as an 'eNB') and at least one RRH that is connected to the eNB through an optical cable or an optical fiber and is wiredly controlled, and has a high transmission power or a low transmission power within a macro cell area.

Hereinafter, a downlink refers to communication or a communication path from a multi-transmission/reception point to a terminal, and an uplink refers to communication or a communication path from a terminal to a multi-transmission/reception point. In a downlink, a transmitter may be a part of a multiple transmission/reception point and a receiver may be a part of a terminal. In an uplink, a transmitter may be a part of a terminal and a receiver may be a part of a multiple transmission/reception point.

Hereinafter, the situation in which a signal is transmitted and received through a PUCCH, a PUSCH, a PDCCH, a PDSCH, or the like may be described through the expression, "a PUCCH, a PUSCH, a PDCCH, or a PDSCH is transmitted or received".

In addition, hereinafter, the expression "a PDCCH is transmitted or received, or a signal is transmitted or received through a PDCCH" includes "an EPDCCH is transmitted or received, or a signal is transmitted or received through an EPDCCH".

That is, a physical downlink control channel used herein may indicate a PDCCH or an EPDCCH, and may indicate a meaning including both a PDCCH and an EPDCCH.

In addition, for ease of description, an EPDCCH, which corresponds to an embodiment of the present invention, may be applied to the part described using a PDCCH and to the part described using an EPDCCH.

Meanwhile, higher layer signaling includes an RRC signaling that transmits RRC information including an RRC parameter.

An eNB executes downlink transmission to terminals. The eNB 110 may transmit a Physical Downlink Shared Channel (PDSCH) which is a primary physical channel for unicast transmission, and may transmit a Physical Downlink Control Channel (PDCCH) for transmitting downlink control information, such as scheduling required for reception of a PDSCH, and scheduling grant information for transmission of an uplink data channel (for example, a Physical Uplink Shared Channel (PUSCH)). Hereinafter, transmission and reception of a signal through each channel will be described as transmission and reception of a corresponding channel.

FIG. 1 is a diagram illustrating a PDCCH and an EPDCCH for transmitting downlink control information.

Referring to FIG. 1, in a 3GPP LTE/LTE-Advanced system, a downlink control channel (e.g., a PDCCH or an EPDCCH) is defined as a physical control channel for transmitting downlink control information (DCI) for a UE.

For example, when a UE accesses a cell, the UE may monitor i) a UE-specific search space (USS) defined in a PDCCH or an EPDCCH and ii) a common search space (CSS) defined in a PDCCH. For example, a UE may receive i) UE-specific downlink control information that is scrambled using a cell-radio network temporal)/identifier (C-RNTI) of the corresponding UE and ii) cell-specific downlink control information that is scrambled using a system information-radio network temporary identifier (SI-RNTI), a paging-radio network temporal)/identifier (P-RNTI), and a random access-radio network temporal)/identifier (RA-RNTI). Also, when an LTE/LTE-Advanced UE is in an idle state, the UE monitors a CSS of a cell that the UE currently camps on. Thus, the UE may receive scheduling information associated with a paging message for the corresponding UE or scheduling information associated with system information of the corresponding cell, and the UE may receive the corresponding paging message and system information based thereon.

Particularly, for example, the UE monitors i) DCI including scheduling information associated with a system information block (SIB) transmission resource that is transmitted after being CRC scrambled using an SI-RNTI through a CSS formed of control channel element (CCE) #0 to CCE #15 of a PDCCH; ii) DCI including scheduling information associated with a paging message that is transmitted after being CRC scrambled using a P-RNTI; and iii) DCI including scheduling information associated with a random access response (RAR) message that is transmitted after being CRC scrambled using an RA-RNTI. Also, for a fallback operation, the UE may additionally monitor DCI format 0/1A that is scrambled using a C-RNTI of the corresponding UE, which includes scheduling information associated with a PDSCH/PUSCH.

Also, each UE may monitor UE-specific DCI that is scrambled using a C-RNTI of the corresponding UE, which includes scheduling information associated with a PDSCH/PUSCH, through a USS defined through a PDCCH or an EPDCCH.

As described with reference to FIG. 1, typically, a UE receives common control information by monitoring a CSS and receives UE-specific control information by monitoring a USS. However, an MTC UE may repetitively receive downlink control information through a plurality of subframes when a plurality of MTC UEs having various coverage enhancement levels exist in a cell. In this instance, although the MTC UE is aware of the number of repetitive transmissions (e.g., a repetition level), an operation of receiving downlink control information may be accurately performed only after a start subframe where repetitive transmission begins is determined.

Therefore, a detailed method and apparatus may be provided for determining a start subframe of a USS for an MTC UE in accordance with at least one embodiment.

First, hereinafter, an MTC UE will be described in detail in accordance with at least one embodiment.

[Low Complexity UE Category/Type for MTC Operation]

As an LTE network has been used, mobile carriers desire to minimize the number of radio access terminals (RATs) so as to reduce maintenance costs of the network or the like. However, the number of GSM/GPRS network-based MTC products has been increasing, and an MTC that uses a low data transmission rate has been provided at a low cost. Therefore, the LTE network is used for general data transmission, and the GSM/GPRS network is used for MTC. Thus, the mobile carriers need to separately operate two RATs. This may cause inefficiency in utilizing a frequency band, which is a drawback.

To overcome the drawback, a cheap MTC UE that uses the GSM/EGPRS network needs to be changed into an MTC UE that uses the LTE network. To this end, there is a desire for defining low complexity UE category/type that reflects various requirements for lowering the price of the LTE MTC UE and a desire for standardizing related technology for supporting the same.

Also, 20% of the MTC UEs that support an MTC service, such as smart metering, are installed in a deep indoor environment, such as a basement. To perform successful MTC data transmission, the coverage of an LTE MTC UE needs to be enhanced by about 15 dB when compared to the coverage of a typical LTE UE. Also, by additionally taking into consideration decrease in the performance caused by the introduction of low complexity UE category/type for the MTC operation, the coverage of the LTE MTC UE needs to be enhanced by more than about 15 dB.

As described above, to enhance the coverage and to lower the price of the LTE MTC UE, various methods are considered for each physical channel, such as PSD boosting, low coding rate, time domain repetition transmission, or the like.

For example, the requirements of the low complexity UE category/type for the MTC operation are as follows:

Reduced UE bandwidth of 1.4 MHz in downlink and uplink.
  Bandwidth reduced UEs should be able to operate within any system bandwidth.
  Frequency multiplexing of bandwidth reduced UEs and non-MTC UEs should be supported.
  The UE only needs to support 1.4 MHz RF bandwidth in downlink and uplink.
Reduced maximum transmit power.
Reduced support for downlink transmission modes.
  further UE processing relaxations
    Reduced maximum transport block size for unicast and/or broadcast signalling.
    Reduced support for simultaneous reception of multiple transmissions.
    Relaxed transmit and/or receive EVM requirement including restricted modulation scheme. Reduced physical control channel processing (e.g. reduced number of blind decoding attempts).
    Reduced physical data channel processing (e.g. relaxed downlink HARQ time line or reduced number of HARQ processes).
  Reduced support for CQI/CSI reporting modes.

Target a relative LTE coverage improvement—corresponding to 15 dB for FDD—for the UE category/type defined above and other UEs operating delay tolerant MTC applications with respect to their respective nominal coverage.

Provide power consumption reduction for the UE category/type defined above, both in normal coverage and enhanced coverage, to target ultra-long battery life:

For ease of description, an existing LTE UE is referred to as a typical LTE UE, and a new low complexity UE category/type that satisfies the condition for the MTC operation is referred to as an MTC UE. Also, a typical LTE UE or an MTC UE that supports a coverage enhancement function or mode is referred to as an MTC UE or a coverage enhanced (CE) UE.

[Narrowband Definition]

An MTC UE is capable of performing transmission/reception with respect to only about 1.4 MHz (that is, about 6 PRBs) through a subframe, irrespective of a system bandwidth. Therefore, a transmission/reception band of an MTC UE is defined in an uplink/downlink subframe, a 'narrowband' formed of successive 6 PRBs is defined as a unit of allocation, and $$NB_{whole} = \left\lfloor \frac{N_{RB}^{DL}}{6} \right\rfloor$$

downlink narrowbands and $$NB_{whole} = \left\lfloor \frac{N_{RB}^{UL}}{6} \right\rfloor$$

uplink narrowbands are configured based on each system bandwidth. Here, $N_{RB}^{DL}$ denotes the number of downlink resource blocks, an $N_{RB}^{UL}$ denotes the number of uplink resource blocks.

When the narrowband is configured in a system bandwidth, remaining RB(s), which corresponds to the remainder obtained after dividing the total number of PRBs that form the corresponding system bandwidth by 6, are disposed in: both band edges of the system band; the center of the system band; or both edges and the center of the system band. PRBs excluding the remaining RB(s) may be used, and the narrowband may be configured by binding the 6 successive PRBs. The 6 successive PRBs constitute a narrow band in order to increase the PRB numbers.

Hereinafter, a downlink control channel (hereinafter, M-PDCCH) will be described when downlink control information of an MTC UE is transmitted in accordance with at least one embodiment.

[Physical Downlink Control/Data Channel for MTC]

In the systems before or in the typical 3GPP LTE/LTE-Advanced Release-12, a PDCCH and an EPDCCH are defined as a downlink control channel for transmitting/receiving DCI. Particularly, in the systems before or in Release-10, a UE receives a downlink control channel through a PDCCH that is transmitted through first to third OFDM symbols (2-4 OFDM symbols when the system bandwidth is 1.4 MHz) of all of the downlink subframes.

Additionally, in the 3GPP LTE/LTE-Advanced Release-11, an EPDCCH that is a new downlink control channel is defined. A UE is capable of receiving downlink control information through a PDCCH or is capable of receiving downlink control information through an EPDCCH, depending on base station settings.

Basically, in the LTE/LTE-Advanced system, the reception of downlink control information is performed using blind detection through monitoring with respect to a plurality of PDCCH candidates or EPDCCH candidates. To this end, an LTE/LTE-Advanced UE is defined i) to monitor a common search space (CSS) and a UE-specific search space (USS) that is formed of a plurality of PDCCH candidates through a PDCCH region or ii) to monitor a USS formed of a plurality of EPDCCH candidates through an EPDCCH region. In this instance, each PDCCH candidate or each EPDCCH candidate may be formed as a set of control channel elements (CCEs) or enhanced control channel elements (ECCEs), wherein a CCE and an ECCE are basic units of transmission of a PDCCH and an EPDCCH, respectively. A search space (CSS and USS) is defined in order that a UE monitors PDCCH candidates or EPDCCH candidates having a plurality of different aggregation levels, so as to apply link adaptation with respect to the transmission/reception of downlink control information.

However, unlike the typical PDCCH/EPDCCH that is transmitted through a single downlink subframe, in the case of an M-PDCCH, which is a downlink control channel for an MTC UE newly defined in Release-13, repetitive transmission is required through a plurality of downlink subframes for the enhancement of coverage. Accordingly, in the case of an M-PDCCH, a domain of the number of repetitive transmissions (R) is added in addition to an existing aggregation level (L) (L={1, 2, 4, 8, 16, 32}, L={1, 2, 4, 8} for PDCCH) for link adaptation. That is, an M-PDCCH candidate may be defined by a set of an aggregation level L and the number of repetitions R, wherein the aggregation level L is defined by the number of CCEs (or M-CCEs) used for the transmission of the corresponding M-PDCCH in a single downlink subframe, and the number of repetitions R is defined by the number of downlink subframes where repetitive transmission is performed. That is, an M-PDCCH candidates may be defined by {L, R}, and each MTC UE may monitor a plurality of M-PDCCH candidates having different 'L's and 'R's based on a coverage level.

In the same manner, in the event that a downlink data channel (PDSCH) for an MTC UE is transmitted/received, a PDSCH for the MTC UE is repetitively transmitted through a plurality of downlink subframes for the enhancement of coverage. To this end, a BS sets a set of PDSCH repetition levels through a UE-specific RRC signaling, so as to designate the number of repetitive transmissions of a PDSCH based on a coverage level that a corresponding MTC belongs and dynamically signals a repetition level value to be applied to a corresponding PDSCH, through DCI including PDSCH assignment information. Here, the repetition level value to be applied to the PDSCH may be determined based on a PDSCH repetition level to be applied out of the set of repetition levels.

Additionally, a downlink subframe (valid subframe for DL transmission) is capable of performing transmission/reception of a downlink radio channel or a downlink radio signal for an MTC UE, such as an M-PDCCH, a PDSCH, and the like. Such a downlink subframe may also be set to be specific to a cell (cell-specific) by a BS through MTC-SIB1, and broadcasting is performed with respect to MTC UEs in the corresponding cell. That is, the transmission of M-PDCCH candidates or the transmission of a PDSCH may be performed through only a DL valid subframe that is set through the corresponding MTC-SIB1.

As described above, in the event that an MTC UE configures a search space for monitoring M-PDCCH candidates that are configured based on a plurality of {L,R} sets, a single M-PDCCH candidate may be configured throughout a plurality of subframes based on a repetition level (R). Thus, a start subframe of the corresponding search space needs to be defined. Therefore, hereinafter, a scheme of determining a start subframe of a UE-specific search space (USS) for an MTC UE will be described. Hereinafter, for ease of description, an M-PDCCH for an MTC UE will be referred to as a downlink control channel.

Figure 2:
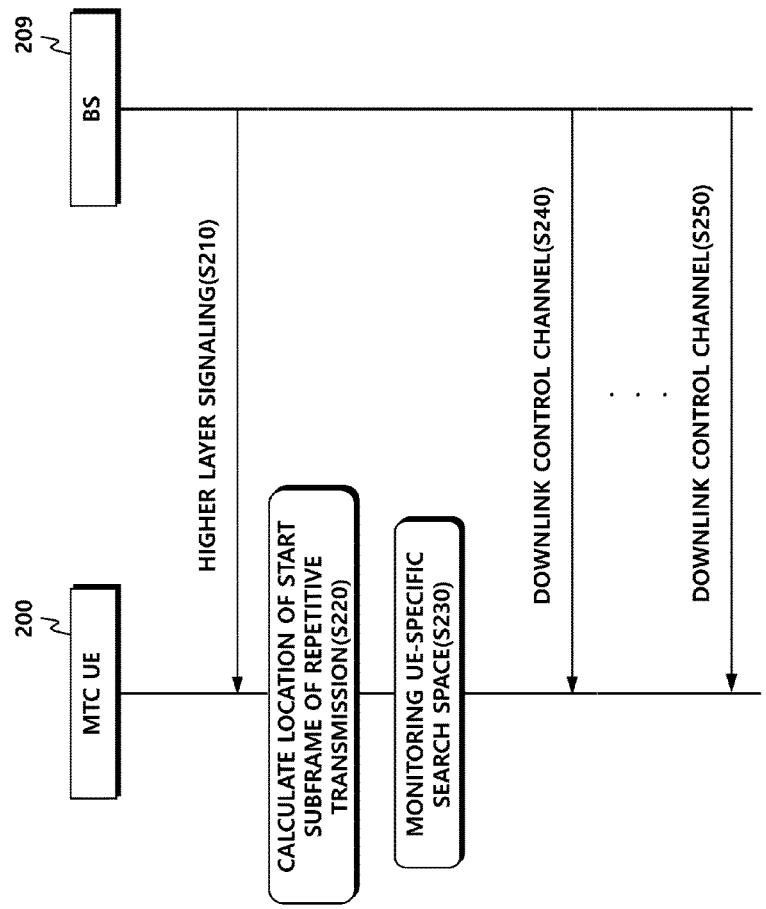
FIG. 2 is a signal flow diagram for illustrating a flow of a signal of an MTC UE and a base station (BS) according to an embodiment of the present disclosure.

FIG. 2 is a signal flow diagram for illustrating a flow of a signal between an MTC UE and a base station according to an embodiment of the present disclosure.

Referring to FIG. 2, according to an embodiment of the present disclosure, a machine type communication (MTC) user equipment (UE) 200 may receive, from a base station (BS) 209, a higher layer signaling including a parameter used for determining a start subframe where a downlink control channel is repetitively transmitted from the BS 209 in operation S210. The higher layer signaling may be an RRC message. Also, the parameter used for determining the start subframe may include at least one of a maximum repetition level and offset information. The maximum repetition level may indicate the maximum value among repetition levels set in a corresponding MTC UE, and the offset information may be a UE-specifically set parameter.

The MTC UE 200 may calculate the location of a subframe where the repetitive transmission of a downlink control channel starts by using the received parameter in operation S220. For example, the MTC UE 200 may repetitively transmit or receive the same information through a plurality of subframes due to coverage and the limitation of power. To this end, the MTC UE 200 is assigned with a repetition level and an aggregation level, and the MTC UE 200 performs repetitive transmission/reception based thereon Therefore, the MTC UE 200 may accurately receive repetitively transmitted downlink information only when the MTC UE 200 is clearly aware of the information associated with a start subframe where the repetitive transmission of downlink information begins. To this end, the MTC UE 200 calculates the location of the start subframe where the repetitive transmission begins, based on the maximum repetition level information and offset information, which are received through a higher layer signaling in accordance with at least one embodiment. For example, the MTC UE may determine the start subframe for receiving a downlink control channel by determining a system frame index and a subframe index that are defined based on the maximum repetition level information and the offset to information. To this end, a modular function may be used. A detailed method of determining a start subframe will be described based on each embodiment provided below.

The MTC UE 200 may monitor a UE-specific search space in two or more subframes including the start subframe in operation S230. For example, when the location of the start subframe is calculated, the MTC UE 200 monitors the UE-specific search space in two or more subframes including the corresponding start subframe. The MTC UE 200 may monitor the UE-specific search space and detect a repetitively received downlink control channel, thereby receiving downlink control information in operation S250. The UE-specific search space may be changed based on an aggregation level of the MTC UE 200.

Through the above, the MTC UE 200 may monitor the UE-specific search space by accurately determining the start subframe where repetitive transmission newly begins.

First Embodiment: A Method of Calculating a Start Subframe Using Start Subframe Period Information and Offset Information Hereinafter, an embodiment for calculating start subframe period information and offset information to be used when an MTC UE calculates the location of the start subframe will be described.

A start subframe of a USS for the MTC UE may be determined based on a period (denoted by Up) and an offset value (denoted by Uo). Also, the period and the offset value may be defined based on a subframe (about 1 ms) unit or a radio frame (about 10 ms) unit. When the period Up and the offset value Uo are determined based on a radio frame unit, a first downlink (DL) valid subframe of a corresponding radio frame may be defined as a start subframe of a corresponding UE-specific search space (USS).

Hereinafter, for ease of description, an embodiment will be described based on an assumption of determining Up and Uo based on a radio frame unit and determining a system frame number (SFN) of a radio frame where the USS begins, based the determined Up and Uo. However, embodiments of the present disclosure are not limited thereto. For example, the same method may be applied when Up or Uo are determined based on a subframe unit.

Hereinafter, P denotes a DL valid subframe configuration unit (or period), and V denotes the number of DL valid subframes configured based on the P-subframe unit. For example, when the DL valid subframe is configured based on a radio frame unit, a corresponding DL valid subframe configuration information region may be formed of a bitmap of 10 bits, and whether or not a subframe is a DL valid subframe may be set for each of 10 subframes (#0-#9 subframes) forming a single radio frame. In this instance, when the corresponding P value is 10 and when the number of subframes set as DL valid subframes through a bitmap of 10 bits is 5, a corresponding value of V is 5. Also, Vr denotes the number of valid subframes for each radio frame. That is, it is defined that Vr=V/(P/10)=10V/P. That is, when a DL valid subframe is allocated based on a radio frame unit, Vr=V.

For example, the period Up of a start subframe of a USS may be determined based on a function of Rmax, Dmax, and Vr.

For example, the period of the start subframe of the USS may be determined based on Equation 1 or Equation 2.

$$U_p = \left\lceil \frac{R_{max} + D_{max}}{V_r} \right\rceil \quad \text{[Equation 1]}$$

$$U_p = \left\lceil \frac{R_{max} + D_{max}}{V_r} \right\rceil + \text{Pad} \quad \text{[Equation 2]}$$

That is, the period of the start subframe may be determined by applying a ceil function to a quotient obtained by dividing the sum of Rmax and Dmax by Vr, as shown in Equation 1 or Equation 2. Alternatively, the period of the start subframe may be determined by adding offset information (Pad) received from a BS to the value obtained by applying a ceil function to the quotient obtained by dividing the sum of Rmax and Dmax by Vr. The offset information Pad may be set to be specific to a UE or a cell, and the offset information Pad may be received from a BS through a higher layer signaling as described above. Alternatively, the offset information, which is set in advance for each coverage level or set in advance to be specific to a cell, may be applied.

Above described Equation 1 and Equation 2 are mere examples of functions of Rmax, Dmax, and Vr for determining a Up value, and various functional formulas that use Rmax, Dmax, and Vr may be applied. That is, all of the cases in which an Up value is determined by using Rmax, Dmax, Vr as parameters may be included in the scope of the present disclosure. Alternatively, in the event that the period Up of the start subframe of the USS is determined, the start subframe may be determined by using at least one of Rmax, Dmax and Vr as a parameter. For example, the period of the start subframe may be determined through a modular arithmetic by using maximum repetition level information and offset information.

As another method, the Up value may be determined explicitly and received from a BS. In this instance, the BS may set and transmit the Up value to an MTC UE through a cell-specific higher layer signaling, and the Up value may be transmitted by being set for each coverage level or by being set to a constant value irrespective of a coverage level. Alternatively, the BS may set the Up value for each MTC UE, and the BS may transmit the same to each MTC UE through a UE-specific higher layer signaling.

In the case of offset information, offset information Uo may be determined for each UE, for each coverage level, or to be specific to a cell, together with Up. When the Uo value is allocated for each UE, the Uo value may be implicitly determined as a function of $n_{RNTI}$ and the C-RNTI value of a UE. For example, the Uo value may be determined through Equation 3.

$$Uo = n_{RNTI} \bmod Up \quad \text{[Equation 3]}$$

Alternatively, the Uo value may be set through a UE-specific higher layer signaling for each UE. When the Uo value is set for each coverage level or is set to be specific to a cell, the Uo value may be set through a cell-specific higher layer signaling.

When Up and Uo are determined through the above described method, the location of the start subframe may be determined based on the function of Up and Uo. For example, the start subframe of the USS may be defined as a first DL valid subframe of a radio frame having a system frame number (SNF) as N that satisfies Equation 4.

$$N \bmod Up = Uo \quad \text{[Equation 4]}$$

Particularly, for example, when Up is defined by Equation 1 and Uo is determined by Equation 3, the start subframe of the USS for an MTC UE may be defined as a first DL valid subframe of a radio frame having an SFN as N that satisfies Equation 5.

$$\left(n_{RNTI} \bmod \left\lceil \frac{R_{max} + D_{max}}{V_r} \right\rceil\right) = \left(N \bmod \left\lceil \frac{R_{max} + D_{max}}{V_r} \right\rceil\right) \quad \text{[Equation 5]}$$

That is, the SFN of a radio frame including a start subframe of a USS may be obtained by applying all types of combinations of the Up determining method and the Uo determining method, and a first DL valid subframe of the corresponding radio frame may be obtained as the start subframe of the USS.

In the above descriptions, the method of extracting the period of a start subframe and offset information and calculating a system frame number by using them, so as to calculate the location of the start subframe, has been described. However, the location of the start subframe may be directly calculated in accordance with at least one embodiment. Hereinafter, a method of directly calculating the location of a start subframe will be described.

Second Embodiment: A Method of Calculating the Location of a Start Subframe Using Maximum Repetition Level Information and Offset Information Although the first embodiment has described a method of using the SFN of a radio frame and offset information to calculate the location of a start subframe, a start subframe index may be directly obtained by using a parameter that is received through a higher layer signaling. In this instance, as opposed to N which is an SFN value, 10*N+n (here, n is a subframe index in a corresponding SFN) may be applied to Equation 5. In the case of determining an Up value to be applied to Equation 4, a start subframe index may be obtained by applying Equation 2. Alternatively, unlike Equation 1 and Equation 2, the start subframe index may be determined based on only an Rmax value and an offset information (Pad) value. A detailed embodiment that uses maximum repetition level information and offset information will be described with reference to FIG. 3.

Figure 3:
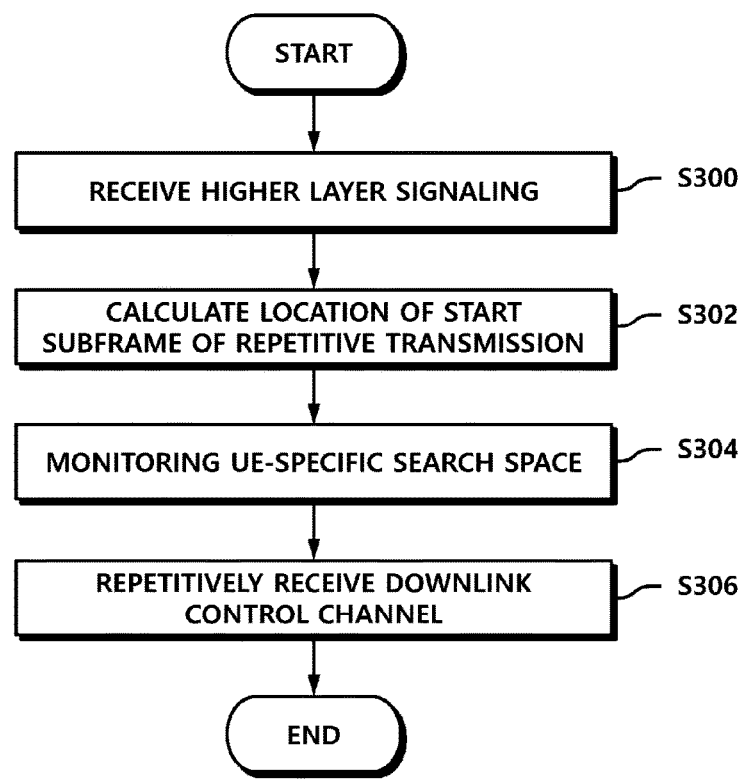
FIG. 3 is a flowchart illustrating operations of an MTC UE according to an embodiment of the present disclosure.

FIG. 3 is a flowchart illustrating operations of an MTC UE according to an embodiment of the present disclosure.

An MTC UE according to an embodiment of the present disclosure may perform: receiving a higher layer signaling including at least one of maximum repetition level information and offset information; calculating the location of a start subframe where the repetitive transmission of a downlink control channel starts, by using a higher layer signaling; monitoring a UE-specific search space in two or more subframes including the start subframe; and repetitively receiving a downlink control channel including downlink control information through the UE-specific search space.

Referring to FIG. 3, the MTC UE may perform: receiving a higher layer signaling including at least one of maximum repetition level information and offset information in operation S300. For example, the MTC UE may receive maximum repetition level information (e.g., Rmax) and offset information through an RRC message. The maximum repetition level information may be set to be specific to a UE. Also, the offset information may be set to be specific to a UE or a cell. The MTC UE may receive information associated with a set of a repetition level and an aggregation level, based on a coverage level or the like, and the MTC UE may receive one or more sets including the repetition level information and aggregation level information. The highest repetition level information among them may be the maximum repetition level information. The maximum repetition level information may indicate the maximum number of repetitive transmissions allocated to an MTC UE and may indicate a level value itself. For example, in association with a set of {aggregation level (L), repetition level (R)} pairs, which constitute M-PDCCH candidates that are allocated for an MTC UE that belongs to a predetermined coverage level to perform monitoring, the maximum value among repetition levels (R) values which constitute the set of {L,R} may be the maximum repetition level (Rmax). Similarly, the maximum value from among PDSCH repetition level values included in a set of PDSCH repetition levels, which is set through an RRC signaling for the MTC UE, may be the maximum repetition level (Dmax).

Also, the MTC UE may perform calculating the location of the start subframe where the repetitive transmission of a downlink control channel begins by using a higher layer signaling in operation S302. The location of the start subframe may be defined by a system frame index and a subframe index. For example, a system frame may be determined by one index out of integers ranging from 0 to 1023, and a subframe index may be determined by one index out of integers ranging from 0 to 9. Through the above, the location of the start subframe may be defined. The system frame may indicate a radio frame based on a 10 ms-unit. The subframe may be determined based on a 1 ms-unit.

Also, the MTC UE may use maximum repetition level information and offset information, which are received through a higher layer signaling, so as to calculate the location of the start subframe. For example, the MTC UE may use the product of the maximum repetition level information and the offset information. As another example, the MTC UE may calculate the location of the start subframe by calculating the period information of the start subframe and the offset information. As another example, the MTC UE may calculate the location of the start subframe through a modular arithmetic, which takes the product of the maximum repetition level information and the offset information as a modulus. The modular arithmetic refers to a calculation method for calculating a predetermined value, which has an identical residual. Particularly, the MTC UE calculates the product of the maximum repetition level information and the offset information as a modulus. Through the above, the MTC UE may calculate the location of the start subframe of which a remainder is 0, through Equation 6.

$$\left(10n_f + \left\lfloor \frac{n_s}{2} \right\rfloor\right) \bmod T = 0 \qquad \text{[Equation 6]}$$

In Equation 6, T is the product of maximum repetition level and offset information, $n_f$ denotes a system frame index, and $n_s$ denotes a subframe index.

Therefore, the MTC UE calculates T by using a parameter that is received through a higher layer signaling, and may calculate, using T, a system frame index and a subframe index which enable the value of the modular arithmetic to be 0.

Alternatively, the MTC UE may calculate the location of the start subframe by separately calculating the period information of the start subframe and the offset information. This will be described later through a separate embodiment.

The MTC UE may perform monitoring a UE-specific search space in two or more subframes including the start subframe in operation S304. When the location of the start subframe is determined, the MTC UE may monitor the UE-specific search space in a plurality of subframes including the location of the start subframe. In the case of the MTC UE, downlink information may be repetitively transmitted through the plurality of subframes for the enlargement of coverage. Therefore, the MTC UE monitors the UE-specific search space in the plurality of subframes. The UE-specific search space that the MTC UE monitors may be changed based on an aggregation level. The aggregation level and the number of subframes that the MTC UE needs to monitor may be set to be specific to a UE. For example, a BS may allocate one or more set information including an aggregation level and a repetition level, to be specific to a UE. The MTC UE may monitor the UE-specific search space using the UE-specifically allocated set information. In this instance, the start subframe may be determined based on the information calculated in operation S302 may be used. Alternatively, the BS may dynamically transmit, to the MTC UE, information indicating a predetermined set out of the set information allocated to the MTC UE and set an aggregation level and a repetition level to be used by the MTC UE. When a plurality of pieces of set information are allocated, information that has the largest value out of the repetition levels included in the plurality of pieces of set information may be the maximum repetition level information.

Through the above, the MTC UE may perform repetitive receiving a downlink control channel that includes downlink control information through the UE-specific search space in operation S306. For example, the MTC UE repetitively receives a downlink control channel through the UE-specific search space monitored out of the plurality of subframes and decodes and determines downlink control information included in the downlink control channel. Here, the downlink control channel indicates an M-PDCCH defined for the MTC UE.

Although it has been described that the MTC UE monitors a UE-specific search space in the above descriptions, the descriptions may be applied to a predetermined type of common search space. For example, in the case of calculating the location of a start subframe of type 0 and type 2 common search space, the descriptions of FIG. 3 may be equally applied.

Figure 4:
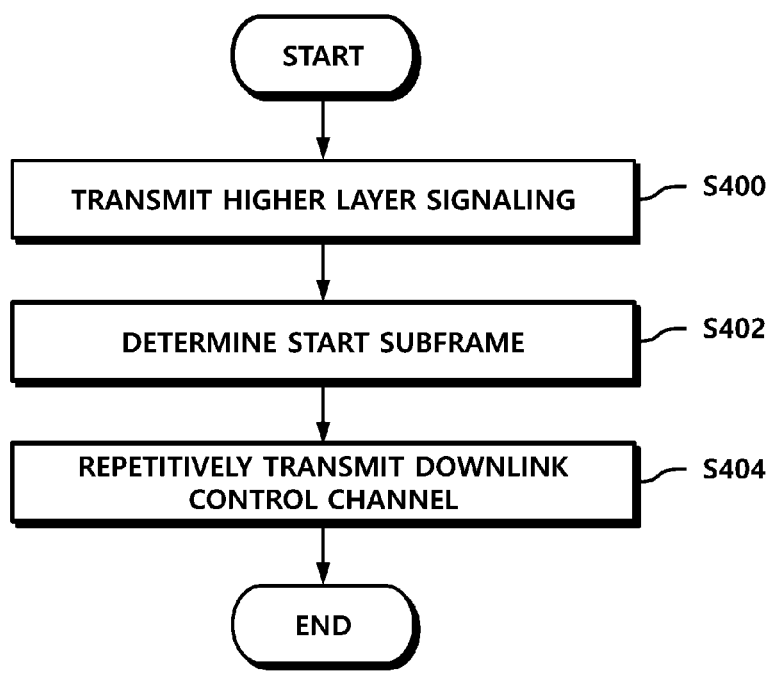
FIG. 4 is a flowchart illustrating operations of a BS according to an embodiment of the present disclosure.

FIG. 4 is a flowchart illustrating operations of a BS according to an embodiment of the present disclosure.

Referring to FIG. 4, when a BS transmits downlink control information, the BS may perform transmitting, to a machine type communication (MTC) UE, a higher layer signaling including at least one of maximum repetition level information and offset information in operation S400. The BS may set a set of repetition level and aggregation level pairs, for each MTC UE, and transmit the same. Also, the BS may transmit offset information to be used for determining a start subframe of repetitive transmission. The maximum repetition level may be the max value out of repetition levels. The maximum repetition level information may indicate a level value itself or the maximum number of repetitive transmissions based on a corresponding level value.

Also, the BS may perform determining the start subframe of a downlink control channel for the MTC UE by using a higher layer signaling in operation S402. The BS may calculate the location of the start subframe using the maximum repetition level information and offset information, in association with an MTC UE. The location of the start subframe may be defined by a system frame index and a subframe index, as described in the second embodiment. Alternatively, the location of the start subframe may be determined by the period information of a start subframe and offset information, as described in the first embodiment.

Particularly, the BS may calculate the location of the start subframe based on the product of the maximum repetition level information and the offset information. For example, the BS may calculate the location of the start subframe through the modular arithmetic that takes the product of the maximum repetition level information and the offset information as a modulus, as shown in Equation 6.

Also, the BS may perform repetitive transmitting a downlink control channel that includes downlink control information through two or more subframes including the start subframe in operation S404. The BS may repetitively transmit, to the MTC UE, the downlink control information through the UE-specific search space of the calculated start subframe. The repetitive transmission may be performed through the plurality of subframes, and the number of repetitive transmissions may be determined by a repetitive transmission level that is set for each MTC UE.

The configuration of an MTC UE and a BS, which may perform all of the embodiments of the present disclosure that have been described above, will be described again with reference to drawings.

Figure 5:
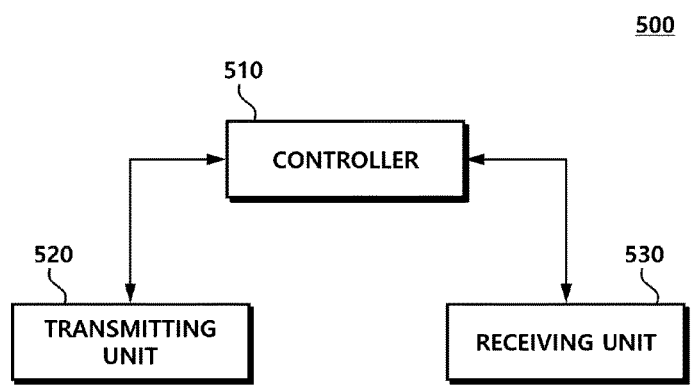
FIG. 5 is a block diagram illustrating a configuration of an MTC UE according to an embodiment of the present disclosure.

FIG. 5 is a block diagram illustrating a configuration of an MTC UE according to an embodiment of the present disclosure.

Referring to FIG. 5, according to an embodiment, an MTC UE 500 may include: a receiving unit 530 and a controller 510. The receiving unit 530 may receive a higher layer signaling including at least one of maximum repetition level information and offset information. The controller 510 may calculate the location of a start subframe where repetitive transmission of a downlink control channel starts, using a higher layer signaling, and monitor a UE-specific search space in two or more subframes including the start subframe. The location of the start subframe may be calculated by period information and offset information, or may be defined by a system frame index and a subframe index.

Also, the receiving unit 530 may repetitively receive a downlink control channel including downlink control information, through the UE-specific search space. In addition, the receiving unit 530 may receive, from a BS, downlink information, data, or a message through a corresponding channel.

The controller 510 may control the general operations of the MTC UE 500 in association with determining a start subframe of a USS for the MTC UE, which are required to implement at least one embodiment. Also, the controller 510 may determine maximum repetition level information from a set of aggregation level and repetition level pairs, which is received from the BS. The controller 510 may calculate the location of the start subframe through a modular arithmetic that uses the product of the maximum repetition level information and offset information. Also, the controller 510 may monitor the USS in a plurality of subframes from the location of the calculated start subframe.

The transmitting unit 520 may transmit, to the BS, uplink control information, data, and a message through a corresponding channel.

Figure 6:
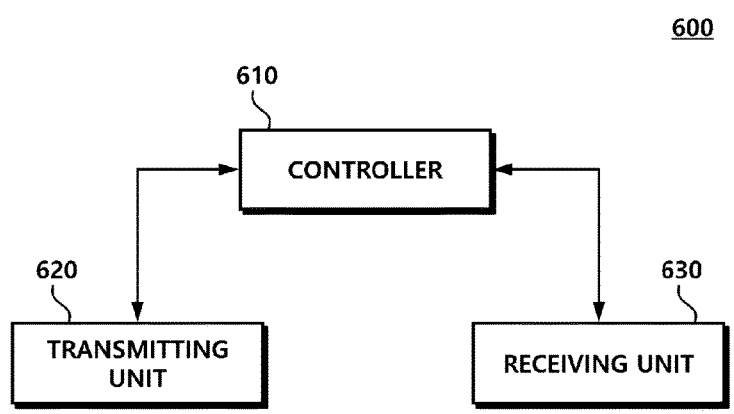
FIG. 6 is a block diagram illustrating a configuration of a BS according to an embodiment of the present disclosure.

FIG. 6 is a block diagram illustrating a configuration of a BS according to an embodiment of the present disclosure.

Referring to FIG. 6, a BS 600 that transmits downlink control information may include: a transmitting unit 620 and a controller 610. The transmitting unit 620 may transmit, to a machine type communication (MTC) UE, a higher layer signaling including at least one of maximum repetition level information and offset information. The controller 610 may determine a start subframe of a downlink control channel for the MTC UE by using a higher layer signaling.

Also, the transmitting unit 620 may repetitively transmit a downlink control channel that includes downlink control information through two or more subframes including the start subframe.

The controller 610 may generate maximum repetition level information from a set of aggregation level and repetition level pairs, and may calculate the location of the start subframe through modular arithmetic that uses the product of the maximum repetition level information and offset information. In addition, the controller 610 may control the general operations of the BS 600 in association with determining a start subframe of a USS for the MTC UE, which are required to implement the present invention.

The transmitting unit 620 and the receiving unit 630 may be used for transmitting/receiving, to/from the MTC UE, a signal, a message, and data needed for performing the aforementioned present invention.

The content associated with the standard or standard documents, mentioned in the above described embodiments, has been omitted for simple description of the present specifications, but it may be a part of the present specifications. Therefore, when a part of the content and documents associated with the standard is added to the present specifications or is specified in claims, it should be construed as a part of embodiments of the present disclosure Although at least one preferred embodiment of the present disclosure has been described for illustrative purposes, those skilled in the art will appreciate that various modifications, additions and substitutions are possible, without departing from the scope and spirit of the invention as disclosed in the accompanying claims. Therefore, exemplary aspects of the present disclosure have not been described for limiting purposes. The scope of the present disclosure shall be construed on the basis of the accompanying claims in such a manner that all of the technical ideas included within the scope equivalent to the claims belong to the present disclosure.

What is claimed is:

1. A method for a machine type communication (MTC) user equipment (UE) to receive downlink control information, the method comprising:
   receiving a higher layer signaling including at least one of maximum repetition level information and offset information;
   calculating, by using the higher layer signaling, a location of a start subframe where repetitive transmission of a downlink control channel starts;
   monitoring a UE-specific search space, determined based on the location of the start subframe, in two or more subframes including the start subframe; and
   repetitively receiving the downlink control channel including downlink control information through the UE-specific search space,
   wherein the location of the start subframe is calculated based on a product of the maximum repetition level information and the offset information.

2. The method of claim 1, wherein the location of the start subframe is defined by a system frame index and a subframe index.

3. The method of claim 1, wherein the location of the start subframe is calculated through a modular arithmetic that takes the product of the maximum repetition level information and the offset information as a modulus.

4. A method for a base station to transmit downlink control information, the method comprising:
   transmitting, to a machine type communication (MTC) user equipment (UE), a higher layer signaling including at least one of maximum repetition level information and offset information;
   determining a start subframe of a downlink control channel for the MTC UE by using the higher layer signaling; and
   repetitively transmitting the downlink control channel including downlink control information through two or more subframes including the start subframe,
   wherein a location of the start subframe is calculated based on a product of the maximum repetition level information and the offset information.

5. The method of claim 4, wherein a location of the start subframe is defined by a system frame index and a subframe index.

6. The method of claim 4, wherein the location of the start subframe is calculated through a modular arithmetic that takes the product of the maximum repetition level information and the offset information as a modulus.

7. A machine type communication (MTC) user equipment (UE) for receiving downlink control information, the MTC UE comprising:
   a receiving unit configured to receive a higher layer signaling that includes at least one of maximum repetition level information and offset information; and
   a controller configured to perform:
   calculating, by using the higher layer signaling, a location of a start subframe where repetitive transmission of a downlink control channel starts; and
   monitoring a UE-specific search space, determined based on the location of the start subframe, in two or more subframes including the start subframe,
   wherein the receiving unit repetitively receives the downlink control channel including the downlink control information through the UE-specific search space; and
   wherein the location of the start subframe is calculated based on a product of the maximum repetition level information and the offset information.

8. The MTC UE of claim 7, wherein the location of the start subframe is defined by a system frame index and a subframe index.

9. The MTC UE of claim 7, wherein the location of the start subframe is calculated through a modular arithmetic that takes the product of the maximum repetition level information and the offset information as a modulus.

* * * * *